(No Model.) 2 Sheets—Sheet 1.

J. W. HALL.
PNEUMATIC TIRE.

No. 531,927. Patented Jan. 1, 1895.

Witnesses
A. N. Dobson
G. P. Kramer

Inventor
J. W. Hall

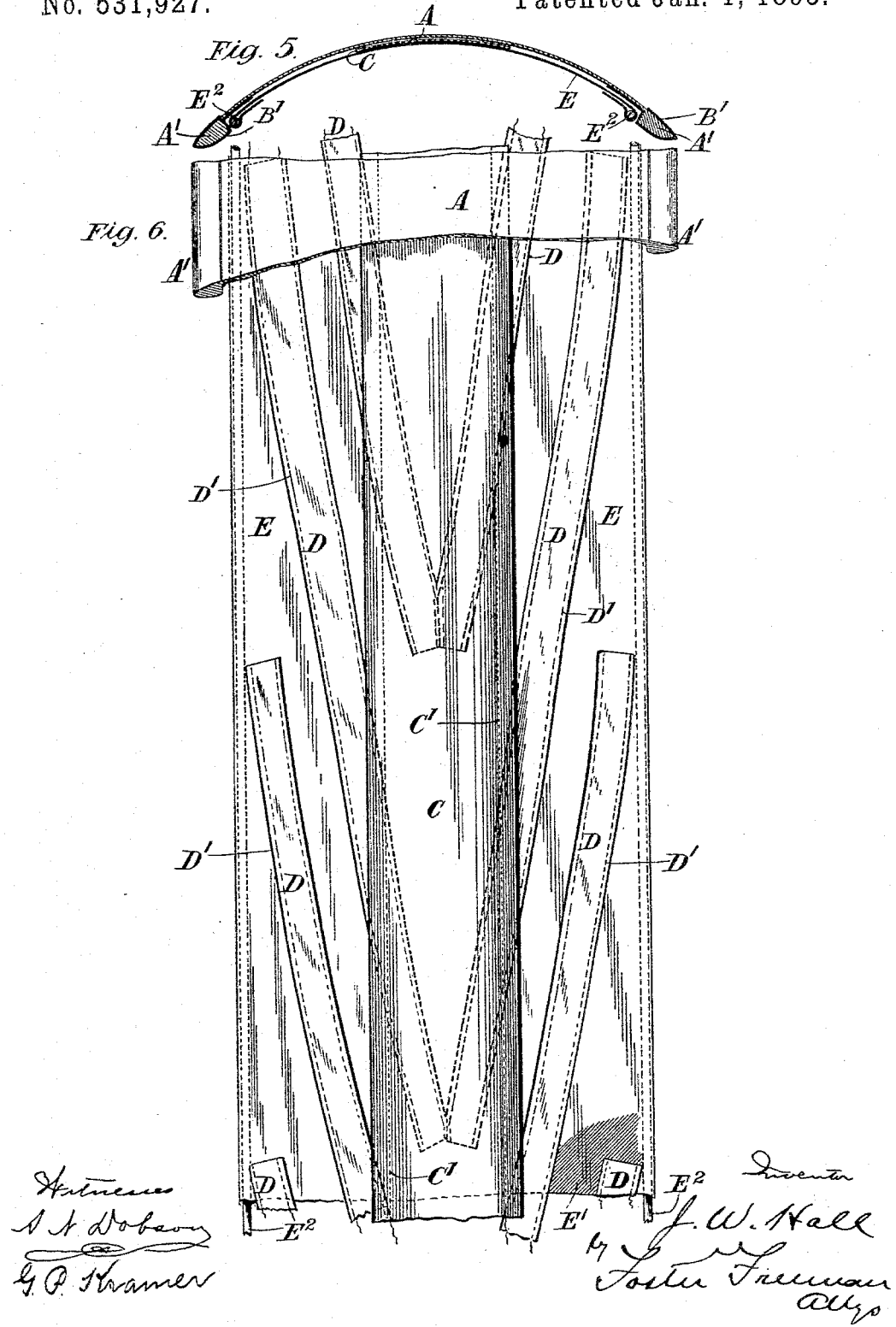

UNITED STATES PATENT OFFICE.

JOHN WILLIAM HALL, OF BIRMINGHAM, ENGLAND.

PNEUMATIC TIRE.

SPECIFICATION forming part of Letters Patent No. 531,927, dated January 1, 1895.

Application filed March 3, 1894. Serial No. 502,203. (No model.)

*To all whom it may concern:*

Be it known that I, JOHN WILLIAM HALL, a subject of the Queen of England, residing at Birmingham, England, have invented certain new and useful Improvements in or Relating to Pneumatic Tires, of which the following is a specification.

This invention has for its object so to construct a pneumatic tire that while preserving the necessary elasticity in a transverse direction to enable the air tube or bag to be properly inflated it may be practically inelastic in a circumferential direction either at all parts throughout its width or certainly at the parts of the width extending from the wheel rim to the tread surface, the object of this being to insure the transference through the tire to the ground of the same amount of power that is applied to the wheel rim without loss being incurred by the circumferential stretching of the tire as is the case where the tire is elastic between the rim and the tread surface.

The invention consists in securing canvas, tape or other such inelastic or unstretchable material to the outer cover or if desired to the inner cover when such is used, or it may be to both in such position or direction as to locate the inelasticity at the required parts of the tire.

Figure 1:
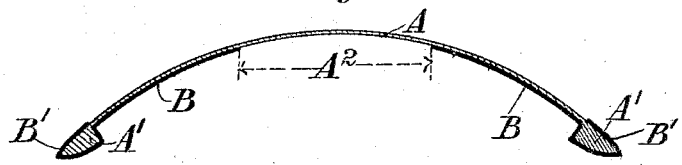
Figure 2:
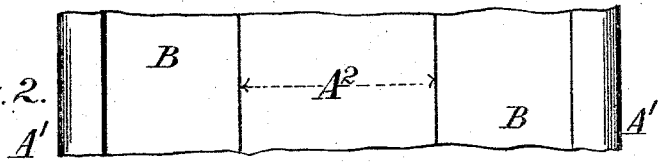
Figure 3:
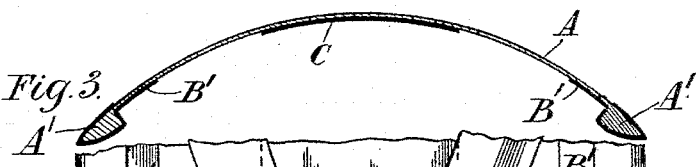
Figure 4:
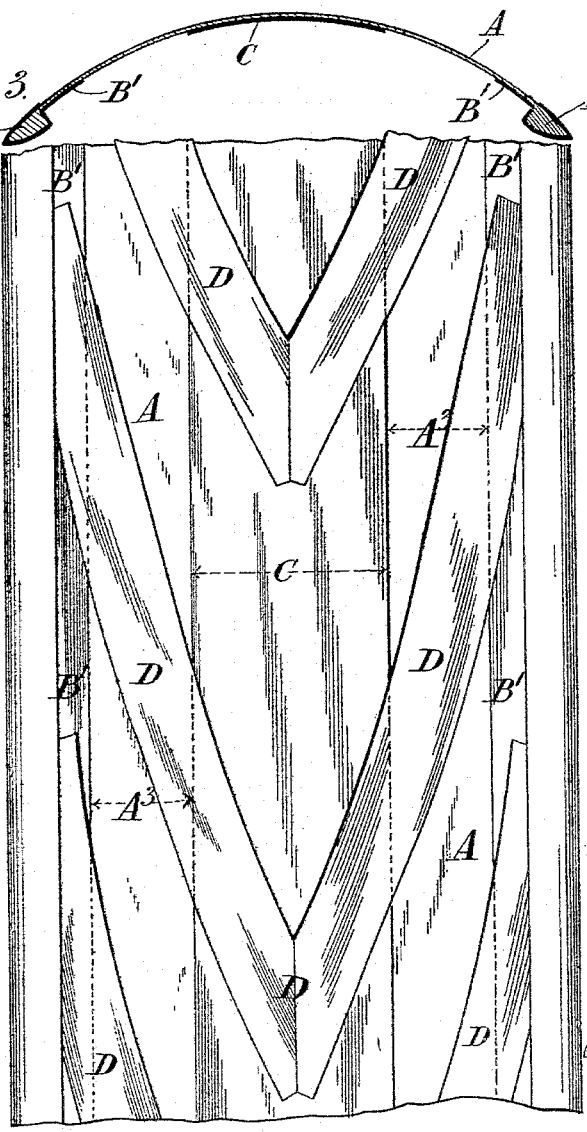

In the accompanying drawings, Figure 1 is a transverse section and Fig. 2 a plan of the inner side or portion of one arrangement of the outer cover constructed according to this invention. Figs. 3 and 4 are views respectively similar to Figs. 1 and 2 of another arrangement of the outer cover. Fig. 5 is a transverse section and Fig. 6 a view showing in plan part of the outer sides of both outer and inner covers, the latter of which in this example is provided with non-stretchable devices.

Like letters indicate like parts throughout the drawings.

The outer cover A shown in Figs. 1 and 2 is formed of india-rubber and has canvas or equivalent strips B solutioned or otherwise secured to it or incorporated with it by vulcanization. Each of these strips may be wrapped over one of the edges A' (which are here shown beaded, but may be otherwise formed) of the cover A and extend to a small extent over the outer surface thereof, said strip extending on the inner surface to about one-half or three-fourths of an inch from the center so as to leave an uncovered portion $A^2$ of from preferably one inch to one and a half inches wide at the center or tread of the tire. It will be seen by this construction that the portion $A^2$ of the cover A retains its original elasticity for securing a good grip of the ground and that the parts covered by the canvas or equivalent B are rendered practically inelastic so that the power transferred across them from the wheel rim to the tread surface is not prejudicially affected.

To the edges of the covers A shown in Figs. 3, 4, 5, and 6, canvas or equivalent strips B are applied as in the preceding example, but unlike those before described do not extend so far over the inner surface of the cover, the object of these strips in these two arrangements (Figs. 3 to 6) being merely to render the edges unstretchable.

In the arrangement shown in Figs. 3 and 4 the tread or central portion of the cover A is rendered practically unstretchable both in a transverse and in a circumferential direction by means of a strip C of canvas or tape secured as by solutioning and extending all round the inner side of A. The parts $A^3$ between B' and C are rendered practically unstretchable in a circumferential direction by means of tape or canvas strips D extending diagonally across $A^3$ and secured, as by solutioning, to the inner side of B', A and C. The angle at which the strips D are laid across the parts $A^3$ does not materially interfere with the elasticity of these parts in a transverse direction.

The arrangement shown in Figs. 5 and 6 embodies the main features of that last described, similar means being employed for correspondingly locating the inelasticity at the desired parts. In this example however the strips C and D are sewed as indicated at C' and D' respectively or otherwise secured, as by solutioning, to preferably the outer side of the inner canvas cover E. This cover as ordinarily is formed of material cut on the bias, as indicated by the lines E', in Fig. 6, so as to give it the necessary elasticity to enable the air tube or bag to be properly inflated within it and the strips or tapes C and D render said cover practically inelastic in a circumferential direction between B' and C while not materially interfering with its transverse elasticity. The canvas or equivalent cover E need not be directly connected with the outer cover A but to prevent creeping it is preferably connected with it at the central part conveniently by solution applied to the outer side of the strip C.

The canvas cover E may be provided with a wire $E^2$ at each edge or with any other of the usual devices for retaining it and if desired also the outer cover A on the wheel rim.

With regard to the constructions shown in Figs. 3 to 6 it will be seen that the strips or tapes D are arranged in pairs one of each pair making an angle with the other and it is to be observed that a tire so constructed should be placed on the wheel so that in traveling the open end of each of these angles reaches the ground before the closed end or apex, the grip of the tire being thereby greatly improved.

The before described improvements may be applied to inner and outer tire covers of other than the form illustrated in the accompanying drawings without departing from the spirit of the invention.

I wish it understood also that instead of using canvas or tape as before described I may use any other suitably-inelastic material.

I claim—

1. A tire cover of elastic material, provided with diagonally disposed strips of inelastic material, whereby the cover is rendered circumferentially unstretchable between the wheel rim and the tread surface, substantially as described.

2. A tire cover of elastic material, provided with strips of inelastic material extending throughout the circumference of the cover, and with other inelastic strips diagonally disposed thereon, whereby the cover is rendered circumferentially unstretchable, while retaining its transverse elasticity at parts, substantially as described.

3. The combination with an otherwise elastic tire-cover, of separate strips of inelastic material laid diagonally across it at intervals, substantially as set forth.

4. The combination with an otherwise elastic tire cover, of separate strips of inelastic material laid diagonally across the cover from its opposite sides, said strips being arranged in pairs and each strip terminating at the center of the tread surface and joining the contiguous opposite strip, substantially as described.

5. The combination with an otherwise elastic tire-cover of strips of inelastic material secured to the edges and to the central portion and extending throughout the circumference thereof and other strips laid diagonally across it substantially as set forth.

6. The combination with an outer tire cover having strips of inelastic material at its edges of a separate inner canvas cover having secured to it strips of inelastic material extending circumferentially and diagonally over it substantially as set forth.

7. The combination with an outer tire-cover having strips of inelastic material at its edges of an attached inner canvas cover having secured to it strips of inelastic material extending circumferentially and diagonally over it substantially as set forth.

In testimony whereof I have hereto set my hand in the presence of two subscribing witnesses.

JOHN WILLIAM HALL.

Witnesses:
ALFRED J. BOULT,
HARRY B. BRIDGE.